March 3, 1970     H. S. ALLEN     3,498,707

FILM READING DEVICE

Filed May 5, 1967     2 Sheets-Sheet 1

INVENTOR
HORACE S. ALLEN
BY Charles B. Haverstick
ATTORNEY

March 3, 1970  H. S. ALLEN  3,498,707
FILM READING DEVICE
Filed May 5, 1967  2 Sheets-Sheet 2
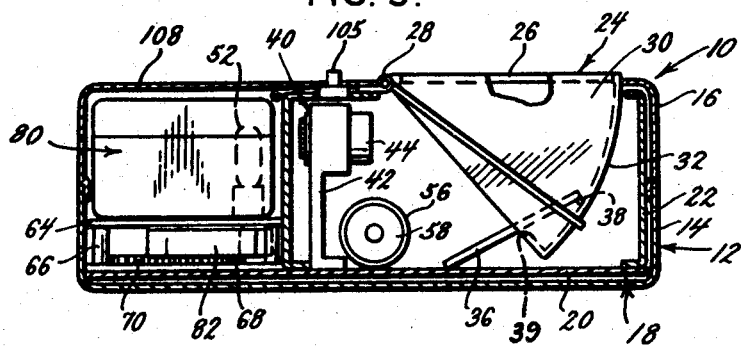
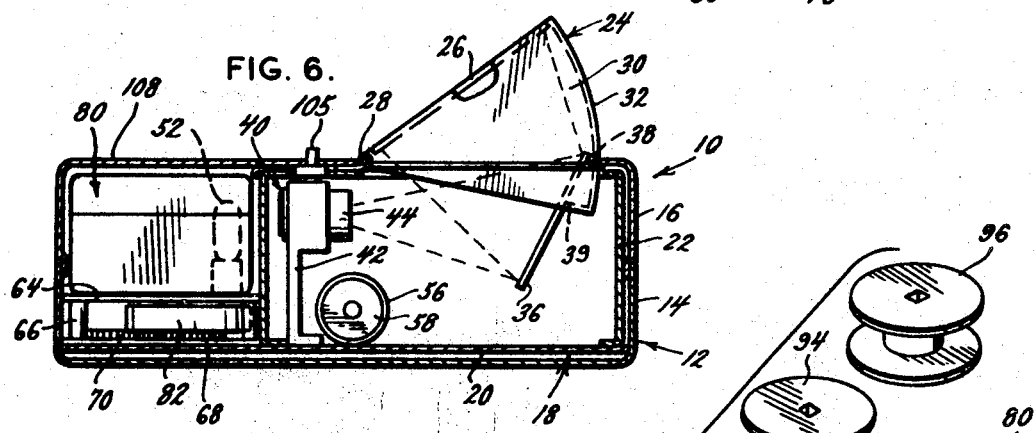
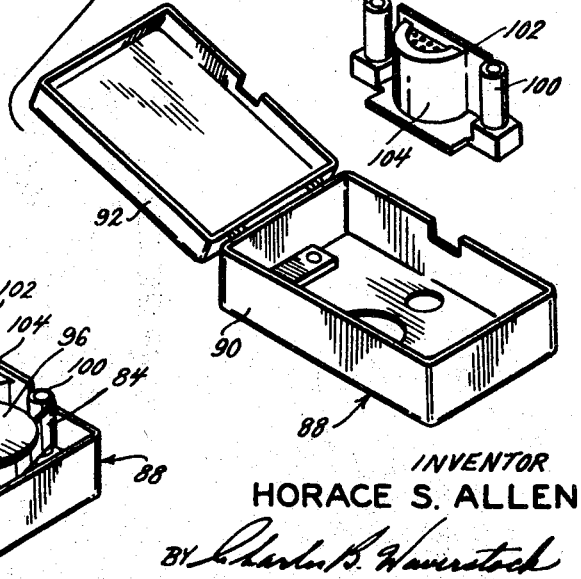
INVENTOR
HORACE S. ALLEN
ATTORNEY

United States Patent Office 3,498,707
Patented Mar. 3, 1970

3,498,707
FILM READING DEVICE
Horace S. Allen, St. Louis, Mo., assignor, by mesne assignments, to McDonnell Douglas Corporation, St. Louis, Mo., a corporation of Maryland
Filed May 5, 1967, Ser. No. 636,473
Int. Cl. G03b 23/12
U.S. Cl. 353—26        7 Claims

ABSTRACT OF THE DISCLOSURE

A portable device for viewing images stored on microfilm comprising a housing having two spaced openings in the upper wall thereof. One opening has a cover thereon, which when opened provides access to a first compartment for receiving a microfilm cartridge and the other opening provides access to a second compartment which houses a screen mounted for movement between an operative and inoperative position. A light bulb is mounted within the compartment for the film cartridge and extends into the cartridge so that light from the bulb is directly projected through the film. The microfilm is wound on spaced spools within the cartridge and movement of the film is accomplished through gears and a magnetic clutch member which receives its power from a self-contained power source.

---

The present invention relates generally to film reading devices and the like and more particularly to a portable device for viewing images on microfilm and the like.

For sometime there has been need of a small, lightweight portable device for viewing images on microfilm contained in a cartridge. All known microfilm viewing devices are relatively complicated, expensive, and non-portable, and for these and other reasons are limited in use and are unsuitable for many applications and purposes.

It is a principal object of the present invention to provide relatively inexpensive, lightweight, portable means for viewing selected images on microfilm or like devices.

Another object is to make information stored on microfilm more readily and universally available and accessible.

Another object is to provide microfilm viewing means which can be constructed as a plug-in appliance or as a battery operated appliance.

Another object is to provide portable microfilm viewing means capable of being used with existing microfilm cartridges.

Another object is to provide a microfilm reader which requires little or no training to operate.

These and other objects and advantages of the present invention will become apparent after considering the following detailed specification which covers a preferred embodiment thereof in connection with the accompanying drawings, wherein:

FIG. 5 is a cross-sectional view taken on line 5—5 of FIG. 1;

FIG. 6 is a cross-sectional view similar to FIG 5 but showing the optical mechanism in operating condition;

FIG. 7 is an enlarged perspective view of a typical film cartridge for use in the subject device, said cartridge being shown in open condition; and FIG. 8 is an exploded perspective view of the film cartridge of FIG. 7.

Figure 1:
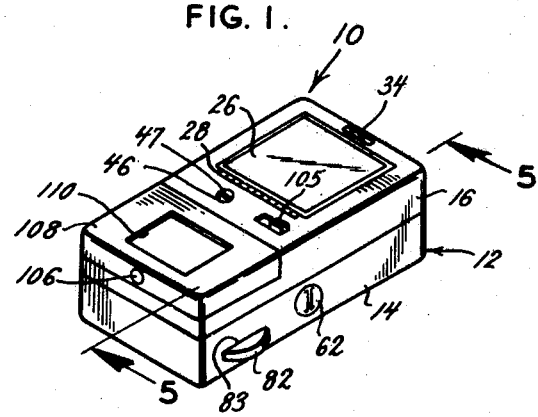
FIG. 1 is a perspective view of a microfilm reading device constructed according to the present invention.
Figure 3:
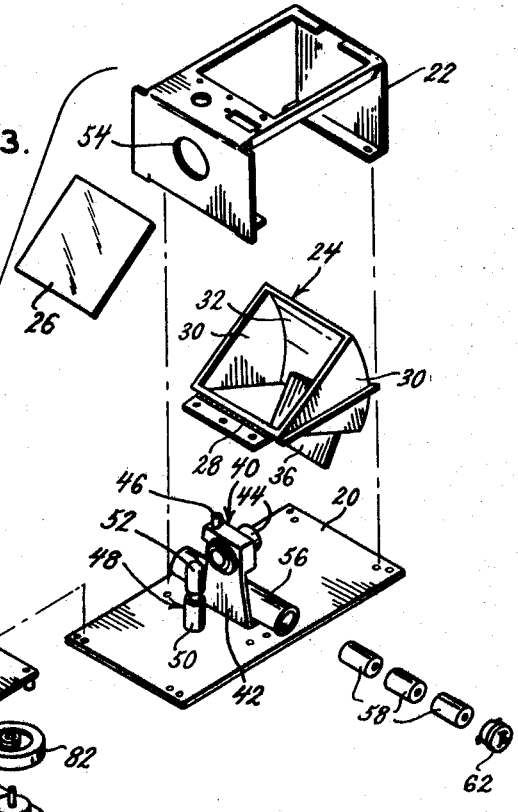
FIG. 3 is an exploded perspective view showing the principal components of the subject device.

Referring to the drawings more particularly by reference numbers, number 10 in FIG. 1 refers to a microfilm viewing device constructed according to the present invention. The device 10 includes a housing 12 having lower and upper housing members 14 and 16 respectively with chassis assembly 18 positioned therein as shown in FIG. 3.

Figure 2:
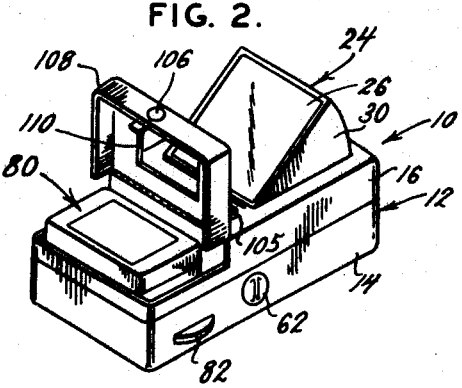
FIG. 2 is a view similar to FIG. 1 showing the subject device in operating condition and with the compartment for the film cartridge open.

The chassis assembly 18 includes a base 20 and an attached U-shaped frame member 22 on which many of the operating parts of the subject device are mounted. A viewing screen assembly 24 including viewing screen 26 is hingedly attached to the U-shaped frame 22 at 28, and is movable between operative and inoperative positions, respectively, as shown in FIGS. 5 and 6. In the inoperative position, the viewing screen 26 is in the plane of the upper surface of the device 10 (FIGS. 1 and 5), and in the operative position the viewing screen is in the raised inclined position shown in FIGS. 2, 3 and 6. The screen assembly 24 is formed of spaced side walls 30 and a curved back wall 32 for light control and support purposes, and yieldable means (not shown) are included to maintain the assembly in its operative position. Latch means 34 are also provided to hold the screen assembly in the inoperative position when the device is not in use. The viewing screen 26 is preferably constructed of a transparent or translucent material to facilitate viewing.

The movable screen assembly 24 includes a mirror 36 which is pivotally attached to the curved back wall 32 at 38 (see FIGS. 5 and 6) so that when the assembly 24 moves from its inoperative position to its operative position the mirror 36 will move on the hinge 38 from the position shown in FIG. 5 to the position shown in FIG. 6 being limited in this movement by engagement with an abutment member 39. The mirror 36 is provided to reflect an image to be viewed onto the viewing surface as will be shown.

A lens assembly 40 including an assembly support 42 is mounted on the chassis base 20 at an intermediate location. The lens assembly 40 includes a tubular lens housing 44 threadedly positioned in a hole provided therefor in the support 42. A rotatable lens adjustment member 46 is journaled in another bore in the support 42, and includes threads which engage other threads formed on the periphery of the housing member 44. When the adjustment member 46 is rotated it rotates the lens assembly 40 in the support 42 and in so doing produces axial movement of the lens assembly to focus an image on the viewing screen 26. The adjustment member 46 extends through a hole in the upper housing member 16 to flush with the upper surface thereof, and the member 46 has a slot 47 in its upper end for receiving a screw driver or a small coin.

A bulb assembly 48 is mounted on the chassis base 20 adjacent to the lens assembly support 42 but on the opposite side thereof from the screen assembly 24. The assembly 48 includes a socket 50 for receiving a projector bulb 52 and the bulb is positioned to be on the optical axis of the lens assembly 40. When the device is in operative condition the light from the bulb 52 passes through the lens assembly 40 and is reflected onto the viewing screen 26. The light from the bulb 52 also passes through a hole 54 formed in the U-shaped frame member 22 (FIG. 4).

A battery tube 56 is mounted on the chassis bases 20 adjacent to the support 42 and batteries such as flashlight type batteries 58 are installed in the tube 56 through an opening 60 formed in the side wall of a lower housing member 14. A removable access plug 62 which includes contact means for engaging one of the batteries to complete the battery circuit is provided to close the opening 60.

A second chassis frame member 64 (FIGS. 3 and 4) is mounted in spaced relationship above the chassis member 20 on supports 66 which include suitable fastener means. Means in the form of mating gears 68, 70, 72 and 74 are mounted for rotation on suitable shafts in the space between the chassis member 20 and the frame member 64. The gear 74 is at one end of the gear chain and is fixedly attached to a clutch member 76 which is preferably formed of magnetic material and extends through a hole 77 formed in the frame member 64. The clutch member 76 at its upper end mates with or engages a steel plate 78 (FIG. 8) mounted on an idler gear or similar drive member in a film magazine or cartridge 80 to provide a drive connection between the gears in the gear chain and the cartridge when the cartridge is positioned in the subject device as will be explained.

Figure 4:
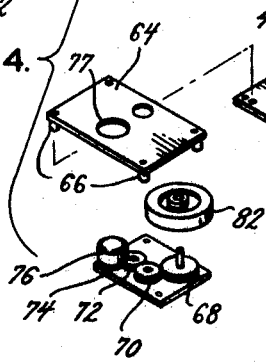
FIG. 4 is an exploded perspective view of the chassis assembly portion of the subject device.

A thumbwheel 82 is mounted for rotation with the gear 68 as shown in FIG. 4, and a portion of one side of the thumbwheel 82 extends through an opening 83 in the side of the housing member 14 when the chassis is positioned therein. The thumbwheel 82 can be rotated in either direction by the operator in order to move a film 84 contained in the film cartridge 80 relative to a viewing position.

The details fo the cartridge 80 are shown in FIGS. 7 and 8 and include a housing 88 formed by two hingedly connected housing members 90 and 92. Two spaced film spools 94 and 96 are positioned in the cartridge housing 88 and the film 84 is wound on the spools and is guided therebetween by a pair of spaced guide rollers 98 and 100 and a film track member 102. A bulb housing and reflector assembly 104 into which the projector bulb 52 is positioned when the cartridge is installed is included in the cartridge 80 and is located adjacent to the track member 102. When the cartridge 80 is installed in the compartment provided therefor on the subject device, the steel plate 78 associated with the idler gear in the film cartridge drive mechanism is magnetically engaged by the magnetic clutch member 76 to provide a driving connection between the thumbwheel 82 and the spools 94 and 96. At the same time the projector bulb 52 which extends up into the bulb reflector assembly 104 is in position to project its light through the particular portion of the film that happens to be positioned in the track member 102. In this way, the exposed portion of the film is illuminated and its image is projected through the lens assembly 40 and reflected by the mirror 36 onto the viewing member 26 as aforesaid. If the image projected onto the viewing surface is fuzzy or out of focus this can be easily and simply corrected by adjusting the threaded adjustment member 46 to reposition the lens assembly 40 using a screw driver or a small coin.

A power supply switch assembly 105 is mounted on the chassis frame member 22 (FIG. 3) and extends upwardly through an opening in the upper housing member 16. The switch 105 has "on" and "off" positions to control a circuit connected between the batteries and the projector bulb 52. It is also contemplated to operate the subject device using power from a conventional wall outlet in which case some means may be needed to convert the input to a desired AC or DC voltage depending on the selection of the projector bulb. A rechargeable power supply can also be used if desired without changing the nature of the invention.

The subject device is operated by opening the compartment into which the film cartridge 80 is positioned as indicated above. This is done by pressing on yieldable latch mechanism 106 located at the end of the upper housing member 16 to enable a hinged upper housing cover portion 108 to be opened. The film cartridge 80 is then inserted into the compartment as aforesaid with the projector bulb 52 extending into the bulb housing 104. At the same time drive means including the member 78 on the cartridge 80 are engaged with the magnetic clutch 76 to establish the drive connection therebetween. When the cartridge is properly installed, the housing door 108 is closed and relatched, and the other latch means 34 are actuated to release the viewing screen assembly 24 so that it will move upwardly to its operative raised position ready for use. In so doing, the mirror 36 will also be properly positioned as aforesaid. The operator now moves the power switch 105 to its "on" position energizing the projector bulb 52, and thereafter he can rotate the thumbwheel 82 in either direction to move the film 84 between the spools 94 and 96 and in so doing locates and properly positions the image he wants to view. Some focusing may also be required. The cartridge construction is usually such that there is also a drive connection or clutching arrangement provided between the spools 94 and 96 as shown generally in FIG. 8. This facilitates rotation of the spools in either direction. Some means are usually also included to tension the film in both directions of movement to make the film wind properly. Various means are available for this purpose and it is not deemed necessary to disclose such means in detail since this feature is not a part of the present invention.

An opening 110 may also be provided in the hinged housing cover 108 to expose a portion of the upper surface of the film cartridge and to provide means for identifying an installed cartridge without having to remove it from the device.

Thus there has been shown and described novel means for viewing images stored on microfilm and other film storage devices which means fulfill all of the objects and advantages sought therefor. Many changes, modifications, variations, and other uses and applications of the subject means will, however, become apparent to those skilled in the art after considering this specification and the accompanying drawings which disclose a preferred embodiment thereof. All such changes, modifications, variations, and other uses and applications which do not depart from the spirit and scope of the invention are deemed to be covered by the invention which is limited only by the claims which follow.

What is claimed is:

1. A device for viewing images stored on microfilm wound on spaced spools of a microfilm cartridge comprising a housing defined by connected upper, side and bottom walls, said upper wall having spaced openings formed therein, a cover hingedly connected to the upper wall adjacent to one of said openings, said housing having a compartment accessable through said one opening when the cover is open for receiving a microfilm cartridge, means in said compartment operatively engageable with the cartridge spools including means for rotating the spools to move the film back and forth therebetween, a light bulb mounted in the compartment for the film cartridge extending into the film cartridge in position to project its light directly through a preselected portion of the film at a location where the film extends between the spools, self-contained power supply means including switch means in the device connected to selectively energize the light bulb, means including an optical system and means having an image viewing surface thereon in optical communication with the light from the light bulb that passes through the film to produce an image thereof on the viewing surface, and means hingedly connecting said means having the viewing surface thereon to the housing adjacent to the other housing opening for movement between an operative position extending outwardly from said other opening and an inoperative position wherein said viewing surface is substantially coplanar with the upper housing wall.

2. The device defined in claim 1 wherein said optical system includes a mirror positioned to receive the image light from the light bulb and to reflect it onto the viewing surface, said mirror and said viewing surface being movable to inoperative positions in which the viewing surface is out of optical communication with the light source.

3. A device for viewing selected images on a film strip extending between spaced spools in a film cartridge comprising a housing having a compartment for receiving the cartridge, said housing including an upper wall having spaced first and second openings formed therein, said first opening providing access to the cartridge compartment, a cover hingedly attached to said upper housing wall adjacent to said first opening and movable between alternative positions opening and closing the cartridge compartment, means in the compartment for operatively engaging the spools including means for rotating the spools to move the film therebetween, a lamp positioned in said compartment extending into the cartridge in position to directly project its light through a selected portion of the film that extends between the cartridge spools, a source of electrical energy positioned within said housing including circuit means connecting said source to energize said lamp, and means for viewing a selected image on said film strip including an optical system formed by optically communicating lens means, mirror means and viewing surface means, said viewing surface means including means hingedly attaching said viewing surface means to the upper housing wall adjacent to said second opening for movement between operative and inoperative positions, said viewing surface means being movable on the housing to a position in which light from the lamp after passing through the selected image and the lens means is reflected by the mirror means onto the viewing surface means.

4. The device defined in claim 3 wherein the viewing surface means includes a translucent screen.

5. The device defined in claim 3 wherein the viewing surface means and the mirror means are mounted on a subassembly of the housing and are movable between an inoperative position inside the housing substantially flash with the housing and an operative position in which the vewing surface extends outwardly from the housing and the mirror means are in position optically communicating the lens means and the viewing surface.

6. The device defined in claim 3 including means for adjusting the lens means to focus the image light onto the viewing surface.

7. The device defined in claim 3 wherein the means for operatively engaging the spools includes gear means and magnetic clutch means, and the means for rotating the spools includes a thumbwheel operatively connected to the gear means.

References Cited

UNITED STATES PATENTS

| | | | |
|---|---|---|---|
| 2,361,398 | 10/1944 | Harris et al. | 353—72 |
| 2,624,232 | 1/1953 | Kingston | 352—78 |
| 2,692,529 | 10/1954 | Halahan | 353—77 |
| 3,234,848 | 2/1966 | Stoothoff | 353—77 |
| 3,319,517 | 5/1967 | Rondas et al. | 353—26 |
| 3,343,450 | 9/1967 | Glaser et al. | 355—14 |
| 3,354,776 | 11/1967 | Smitzer et al. | 353—76 |

NORTON ANSHER, Primary Examiner

R. M. SHEER, Assistant Examiner

U.S. Cl. X.R.

353—77